(12) United States Patent
Tausendfreund et al.

(10) Patent No.: US 12,009,646 B2
(45) Date of Patent: Jun. 11, 2024

(54) DEVICE FOR ACCOMMODATING A CABLE ASSEMBLY

(71) Applicant: A. RAYMOND ET CIE, Grenoble (FR)

(72) Inventors: Thomas Tausendfreund, Efringen-Kirchen (DE); Andreas Glagau, Schopfheim (DE); Andy Junge, Kandern (DE); Franziska Krüger, Rheinfelden (DE); Christian Kolb, Binzen (DE)

(73) Assignee: A Raymond et Cie, Grenoble (FR)

( * ) Notice: Subject to any disclaimer, the term of this patent is extended or adjusted under 35 U.S.C. 154(b) by 730 days.

(21) Appl. No.: 17/051,282

(22) PCT Filed: May 6, 2019

(86) PCT No.: PCT/EP2019/061536
§ 371 (c)(1),
(2) Date: Oct. 28, 2020

(87) PCT Pub. No.: WO2019/215077
PCT Pub. Date: Nov. 14, 2019

(65) Prior Publication Data
US 2021/0234347 A1    Jul. 29, 2021

(30) Foreign Application Priority Data
May 7, 2018    (DE) .................... 10 2018 003 688.0

(51) Int. Cl.
*H02G 3/04* (2006.01)
*B60R 16/02* (2006.01)

(52) U.S. Cl.
CPC ......... *H02G 3/0418* (2013.01); *H02G 3/0456* (2013.01); *B60R 16/0215* (2013.01)

(58) Field of Classification Search
CPC ............... H02G 3/0418; H02G 3/0456; B60R 16/0215; Y10T 292/096; Y10T 292/44026; F16B 5/0664
See application file for complete search history.

(56) References Cited

U.S. PATENT DOCUMENTS 4,864,082 A     9/1989   Ono et al.
4,951,716 A *   8/1990   Tsunoda ............... H02G 3/0418
                                                                    174/101

(Continued)

FOREIGN PATENT DOCUMENTS

CN          1622412 A       6/2005
CN        103079424 A       5/2013

(Continued)

OTHER PUBLICATIONS

English translation of International Search Report for PCT/EP2019/061536 dated Jul. 30, 2019, 2 pages.

(Continued)

*Primary Examiner* — Christine M Mills
*Assistant Examiner* — Matthew J Sullivan
(74) *Attorney, Agent, or Firm* — Warner Norcross + Judd LLP

(57) ABSTRACT

Disclosed is a device for accommodating a cable assembly. The device comprises a casing having a receiving portion with a connecting piece which is connected at its first end to the casing and extends away from the casing toward its second end; with two side sections each connected to the connecting piece at one end, extending toward the other end away from the connecting piece, and extending in different directions. The device further comprises a cover having an insertion part for insertion into the receiving portion, the insertion part having two sub-sections and each sub-section has an engaging element. The device is designed such that the insertion part can be inserted into the receiving portion, (Continued)

wherein the connecting piece is then located between the sub-sections. When the insertion part is inserted until each engaging element has passed a side section, the engaging elements prevent the insertion part from sliding out.

11 Claims, 2 Drawing Sheets

(56) References Cited

U.S. PATENT DOCUMENTS

| | | | |
|---|---|---|---|
| 5,134,250 A * | 7/1992 | Caveney | H02G 3/0418 174/101 |
| 5,401,905 A | 3/1995 | Lesser et al. | |
| 5,709,249 A | 1/1998 | Okada et al. | |
| 6,161,267 A * | 12/2000 | Trautwein | H02G 3/0406 24/635 |
| 6,198,043 B1 * | 3/2001 | Hoffmann | H02G 3/0418 174/95 |
| 6,878,879 B2 | 4/2005 | Takahashi et al. | |
| 6,967,286 B2 | 11/2005 | Daito | |
| 7,017,615 B2 | 3/2006 | Suzuki et al. | |
| 7,307,217 B2 | 12/2007 | Daito | |
| 7,825,339 B2 | 11/2010 | Suzuki | |
| 8,124,887 B2 | 2/2012 | Suzuki | |
| 8,188,368 B2 | 5/2012 | Suzuki | |
| 8,251,409 B2 * | 8/2012 | Chang | H04M 1/0249 292/137 |
| 8,677,573 B2 * | 3/2014 | Lee | F16B 21/076 24/297 |
| 8,757,673 B2 * | 6/2014 | Davis | H02G 3/0418 174/67 |
| 8,864,085 B2 * | 10/2014 | He | H02G 3/0418 361/752 |
| 8,955,693 B2 * | 2/2015 | Larsen | H02G 3/0418 211/26 |
| 10,811,857 B2 * | 10/2020 | Rouleau | F16M 13/02 |
| 11,146,028 B2 * | 10/2021 | Egami | H01R 13/74 |
| 11,233,381 B2 * | 1/2022 | McGowan | H02G 7/00 |
| 11,362,493 B2 * | 6/2022 | Ikeda | H01R 9/2408 |
| 11,451,025 B2 * | 9/2022 | Teece | H02G 3/32 |
| 2003/0222183 A1 | 12/2003 | Kato | |
| 2005/0145410 A1 | 7/2005 | Daito | |
| 2009/0266945 A1 | 10/2009 | Dietrich et al. | |
| 2009/0322191 A1 * | 12/2009 | Chang | H04M 1/0249 292/137 |
| 2012/0321379 A1 * | 12/2012 | Wang | F16B 5/0664 403/321 |
| 2016/0040822 A1 | 2/2016 | Cetnar et al. | |
| 2017/0331263 A1 | 11/2017 | Matsumura et al. | |
| 2020/0119501 A1 * | 4/2020 | Egami | H02G 3/0437 |
| 2023/0096348 A1 * | 3/2023 | Saito | B60R 16/0215 174/72 A |
| 2023/0099209 A1 * | 3/2023 | Saito | H02G 3/0418 174/72 A |
| 2023/0102530 A1 * | 3/2023 | Saito | B60R 16/0215 174/72 A |
| 2023/0120271 A1 * | 4/2023 | Saito | B60R 16/02 174/72 A |
| 2023/0133401 A1 * | 5/2023 | Tanaka | H02G 3/0418 174/72 A |
| 2023/0194022 A1 * | 6/2023 | Varale | F16L 3/1058 248/69 |

FOREIGN PATENT DOCUMENTS

| | | |
|---|---|---|
| CN | 103211362 A | 7/2013 |
| CN | 103781380 A | 5/2014 |
| DE | 10318635 A1 | 12/2003 |
| DE | 102006025706 A1 | 12/2007 |
| DE | 102006026250 A1 | 12/2007 |
| DE | 102012017899 A1 | 3/2014 |
| EP | 0578459 A1 | 1/1994 |
| EP | 2579404 A1 | 4/2013 |
| TW | M262063 U | 4/2005 |

OTHER PUBLICATIONS

Machine assisted English translation of DE102006025706A1 obtained from https://patents.google.com/patent on Oct. 27, 2020, 7 pages.
Machine assisted English translation of DE102012017899A1 obtained from https://patents.google.com/patent on Oct. 27, 2020, 6 pages.

* cited by examiner

DEVICE FOR ACCOMMODATING A CABLE ASSEMBLY

CROSS-REFERENCE TO RELATED APPLICATIONS

This application is the U.S. National Stage Application of International Patent Appl. No. PCT/EP2019/061536 filed on 6 May 2019, which claims priority to and all advantages of German Patent Appl. No. 10 2018 003 688.0 filed on 7 May 2018, the contents of which are hereby incorporated by reference.

FIELD OF THE INVENTION

The invention relates to a device for accommodating a cable assembly. The invention also relates to a system comprising device and cable assembly.

BACKGROUND OF THE INVENTION

Devices for accommodating a cable assembly are known from the prior art. They usually have a casing, in which the cable assembly is accommodated, and a cover. The casing is generally a housing. The cover is locked to the housing by means of a fastener. The fastener in this case consists of a receiving portion and an insertion part which is intended to be inserted into the receiving portion in order to close the fastener. The receiving portion is connected to the housing and the insertion part is connected to the cover. The receiving portion in the prior art is formed similarly to a ring segment connected at both ends to the housing. In devices for accommodating a cable assembly, the receiving portion and the housing are usually made of plastic and are cast in one piece. In this case, the casting material flows first into the mold for the housing and then onward into the mold for the ring-segment-shaped receiving portion. The casting material here enters the mold for the receiving portion via the two ends of the receiving portion, wherein the partial streams thereby arising meet approximately in the middle of the mold for the receiving portion. At this location, a weld line results in the later finished receiving portion, which results in the receiving portion being particularly susceptible to fracture at this location. This is particularly disadvantageous since receiving portions are sometimes exposed to high operating forces. Conventional devices for accommodating cable assemblies under such conditions cannot guarantee reliable fastening. In addition to high operating forces, low temperatures in particular also increase the risk of fracture in devices known from the prior art. In contrast, it has been found that the device according to the invention ensures a more secure fastening even at low temperatures than do comparable conventional devices.

SUMMARY OF THE INVENTION

The object of the present invention is therefore to propose a device for accommodating elongate elements or a grouping of elongate elements which ensures more reliable fastening of casing and cover.

The device for accommodating an element comprises a casing having a receiving portion with a connecting piece which is connected to a housing at its first end and extends toward the second end away from the housing; two side sections each connected to the connecting piece at one end, extending toward the other end away from the connecting piece, and extending in different directions; and a cover having an insertion part for insertion into the receiving portion, wherein the insertion part has two sub-sections and each sub-section has an engaging element. The device is designed such that the insertion part can be inserted into the receiving portion, the connecting piece then being located between the sub-sections, wherein when the insertion part is inserted until each engaging element has passed a side section, the engaging elements prevent the insertion part from sliding out.

The basic idea of the invention is to form the shape of the receiving portion differently in comparison with the shapes of receiving portions in the prior art and thereby in particular to move away from the ring segment shape, which has proved to be susceptible to fracture in the case of receiving portions produced by casting. In that the receiving portion has a connecting piece which is connected to the casing only at its first end and extends away from the casing toward the second end, the casting material during casting only flows over one end into the mold of the receiving portion. In that the receiving portion furthermore comprises two side segments, which in each case are connected to the connecting piece at one end, extend away from the connecting piece toward the other end and extend in different directions, the stream of casting material splits into two different directions and the two partial streams do not meet at a different location but end up in the molds for the respective side sections. As a result, a weld line cannot arise and an associated risk of fracture is thus eliminated.

Surprisingly, it has moreover been found that the device according to the invention can withstand higher loads than comparable devices with known receiving portions and insertion parts without the fastening of cover and casing being inadvertently released in the process. The fastener of the device according to the invention particularly effectively counteracts torsional forces which in comparable devices of the prior art can lead to the fastener popping open. The invention makes use of the finding that torsion is caused by two oppositely directed torques, and proposes to use two engaging elements in such a way that at least one of the two remains in engagement when the device is in torsion so that the entire fastener can hold securely.

The secure fastening permits the casing to be filled compactly with cables. Even if the casing is filled so compactly that the cables press against the cover from the inside when the cover is closed, it can be ensured more reliably than is the case with comparable devices from the prior art that no undesired opening of the cover occurs. This permits a space-saving device and leads to material savings. In particular, it has been found that the casing for accommodating cable assemblies which are exposed to high torsional forces remains securely closed.

The high holding forces can also be attributed to the fact that the insertion part has two sub-sections and each sub-section has an engaging element. The device is designed in such a way that the insertion part can be inserted into the holding piece, the connecting piece then being located between the sub-sections and the engaging element preventing the insertion part from sliding out, provided the insertion part has been inserted to the point where each engaging element has passed a side section.

In addition to reliable fastening, it has also been found that the fastening, which comes about between the novel receiving portion and the insertion part, requires less installation force to be applied than is the case with conventional fasteners. Assembly is also simple and the availability of simple tools is sufficient. This leads to a lower outlay of time and effort, thus to lower costs.

The term "casing" is to be understood in the sense of the invention as meaning a device which outwardly delimits a space so that the space can be filled with objects and this device can thus serve for the storage of items. The phrase "outwardly delimits" means that at least one opening is left which can be closed by the cover. The phrase "outwardly delimits" also includes cases where several openings are provided.

In a certain embodiment, the casing is a housing. The housing serves in particular for the accommodation of an elongate element or a grouping of elongate elements. However, the casing, in particular the housing, can also be designed to accommodate objects other than elongate elements or other items in addition to elongate elements.

An elongate element may, for example, be a cable or a lead. A grouping of elongate elements may thus, for example, be a cable assembly. A cable assembly usually includes a bundle of cables which may or may not be connected to each other.

The housing may, for example, consist of a bottom and two side walls defining an interior space for storing the cables. Furthermore, the housing may have a box shape or a half-tube shape, for example. Other shapes known from the prior art are conceivable.

In many applications (e.g., in vehicles), the housing accommodates only a portion of a cable assembly, with the rest of the cable assembly not being inside the housing. For this application, the housing must have one or more openings in order that the unhoused portion of the cable assembly can enter or exit the housing or in order that the housing can be placed only over this portion. Otherwise, it is also conceivable that the entire housing has no such openings.

In an alternative embodiment, the casing is a container for storing or transporting items. The container may, for example, be made of plastic and be considered for storing food (in particular food and beverages). A container may, for example, be a can.

Within the meaning of the invention, the term "cover" is to be understood as meaning a means for covering the casing, the means being removable from the casing (for example, by being folded open or removed), as a result of which the casing can be loaded with a cable assembly. In this case, covering may be complete or partial. The cover may be slab-shaped or semi-tubular, for example. Also conceivable is a bow-shaped cover which covers only a small part of the casing but in the closed state ensures that the cable assembly cannot escape from the cover opening of the casing. In a specific embodiment, the cover and casing are two separate pieces. Alternatively, however, they can also take the form of a single piece.

The connecting piece serves as a center section which is connected to the casing and to which the side sections are connected. The connecting piece is connected at its first end to that of the casing and extends toward its second end away from the casing. In this case, the connecting piece is typically arranged orthogonally to the surface of the casing to which it is connected. The receiving portion typically has only a single connecting piece, which is connected at its first end to the casing and which extends away from the casing toward the second end and at which the two side sections are respectively connected at their ends. Generally, the two side sections are connected only to the single connecting piece, which is connected at its first end to the casing and extends away from the casing toward the second end, and no other element is provided that connects the side sections to the casing.

The first end of the connecting piece is to be understood as the part of the connecting piece which is connected to the casing. The connecting piece is typically substantially cuboid, for example slab-shaped. In the sense of the invention, a slab shape is to be understood as meaning a secondary form of the cuboid shape in which the thickness is much less than the length and width. In the case of a cuboid or slab-shaped connecting piece, the first end is a side of the cuboid or slab.

The side sections are each connected at one end to the connecting piece and extend away from the connecting piece toward the other end. In doing so, they extend in different directions away from the connecting piece. They can extend in substantially diametrically different directions. The side sections are generally connected to the second end of the connecting piece. In this case, the side sections and the connecting piece have a T-shaped arrangement (comparable to the T-joint in welding).

The side sections are typically cuboid or slab-shaped, with the connecting piece also being typically cuboid or slab-shaped. The side sections in the T-shaped arrangement can take the form of a uniform slab.

The cover has an insertion part for insertion into the receiving portion. The insertion part may also be referred to as a fastener hook. The cover is often embodied in one piece with the insertion part, for example made of a single casting, e.g. with plastic as the casting material. The insertion part has a cover-side end where it is connected to the cover. The insertion part has an end which is remote from the cover and which is intended to be inserted into the receiving portion.

In the engaged connection between insertion part and receiving portion, the connecting piece is located between the sub-sections. There is thus an intermediate space between the sub-sections. The intermediate space has an opening at the end remote from the cover so that the connecting piece can be accommodated in the intermediate space and the sub-sections can thus be inserted deeply enough into the receiving portion to allow engagement to occur.

The sub-sections extend from the end near the cover to the end remote from the cover. The sub-sections are typically substantially slab-shaped. In specific embodiments, they lie in one plane.

In order to ensure a firm connection between insertion part and receiving portion, the sub-sections each comprise an engaging element. When the insertion part is inserted until each engaging element has passed a side section, the engaging element prevents the insertion part from sliding out. When the insertion part is inserted into the receiving portion, the engaging element first slides over the side sections. After passing the side sections, the engaging elements snap in. The engaging elements are generally attached to the end of the sub-sections that is remote from the cover.

The engaging element is, for example, an engaging element, a detent spring, an engagement hook, a latch.

In a certain embodiment, the receiving portion is formed integrally with the casing. In this case, they can be produced by casting, plastic typically being used as the casting material. In contrast to plastic receiving portions in the prior art, receiving portions according to the invention made of plastic have a significantly lower risk of fracture, which is attributable in particular to the absence of a weld line. The receiving portion and the casing are in such embodiments typically produced by injection molding. Alternatively, the receiving portion and the casing may be made of metal. In an alternative embodiment, the receiving portion and the casing are produced by bending and punching.

In these or other embodiments, the engaging elements are tapered in such a way that their width decreases in the insertion direction.

The invention also relates to a system comprising a device according to the invention and an elongate element or a grouping of elongate elements or a section of an elongate element or a grouping of elongate elements arranged in the casing.

BRIEF DESCRIPTION OF THE DRAWINGS

The invention is explained below with reference to drawings illustrating only one embodiment of the invention, wherein.

DETAILED DESCRIPTION

Figure 1:
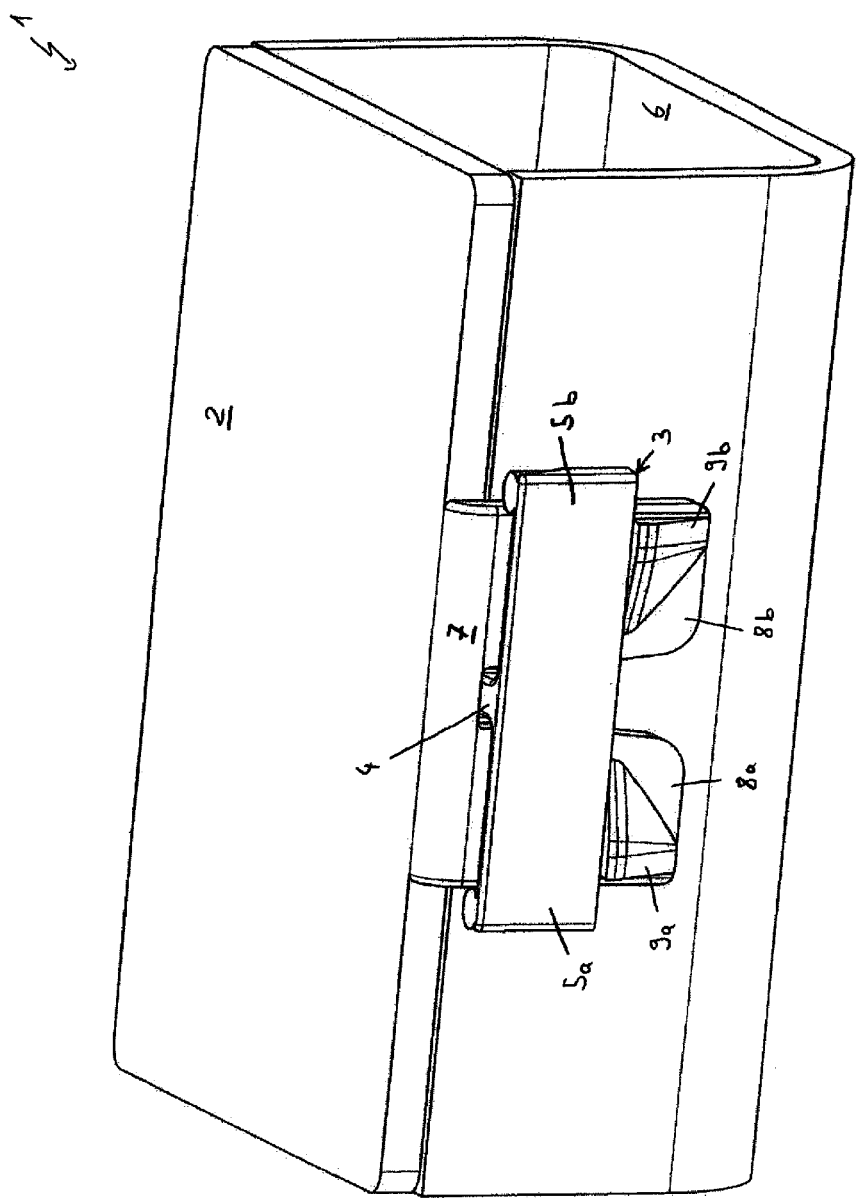
FIG. 1 shows a perspective view of the device according to one embodiment of the invention in the closed state.

FIG. 1 shows a perspective view of an exemplary embodiment of the device 1 according to the invention for accommodating a cable assembly in the closed state. The device 1 comprises a casing, which in the present case is a housing. The housing 2, which has a receiving portion 3 with a connecting piece 4. Receiving portion and housing are formed in one piece and in this example are made of plastic, wherein they have been produced by injection molding. The connecting piece 4 is connected at its first end to the housing 2 and extends away from the housing toward the second end. Furthermore, the receiving portion 3 has two side sections 5a, 5b which are each connected at one end to the connecting piece 4, extend away from the connecting piece 4 toward the other end, and extend in different directions. The side sections 5a, 5b of this exemplary embodiment are connected to the second end of the connecting piece 4 and extend in diametrically different directions.

The device 1 furthermore comprises a cover 6 which has an insertion part 7 for insertion into the receiving portion 3. The insertion part 7 has two sub-sections 8a, 8b, and each sub-section has an engaging element, which in the present example is a latching lug 9a, 9b. The device 1 is designed in such a way that the insertion part 7 can be inserted into the receiving portion 3, wherein the connecting piece 4 is then located between the sub-sections 8a, 8b. The latching lugs 9a, 9b then prevent the insertion piece 7 from sliding out when the insertion part is being inserted until each latching lug 9a, 9b has passed a side section 5a, 5b. In this exemplary embodiment, the latching lugs are tapered in such a way that their width decreases in the insertion direction.

In that the receiving portion 3 has a connecting piece 4 which is connected to the housing 2 only at its first end and extends away from the housing 2 toward the second end, the liquid plastic flows only via one end into the mold of the receiving portion 3 during injection molding. In that the receiving portion furthermore comprises two side segments 5a, 5b, which are each connected to the connecting piece 4 at one end, extend away from the connecting piece 4 toward the other end and extend in different directions, the stream of casting material splits into two different directions and the two partial streams do not meet at a different location but end up in the molds for the respective side sections. As a result, a weld line cannot arise and an associated risk of fracture is thus eliminated. In addition, such a device 1 has in particular a high strength and is easy to operate (to connect and to undo). Thick cable assemblies can in this way be literally crammed into the housing 2 without the risk of the lock springing open. This has the advantage that a space-saving installation is thereby possible and the effort for assembly is low in comparison with locks from the prior art, which in turn leads to significantly lower costs (especially in the case of a plurality of assembly processes).

Figure 2:
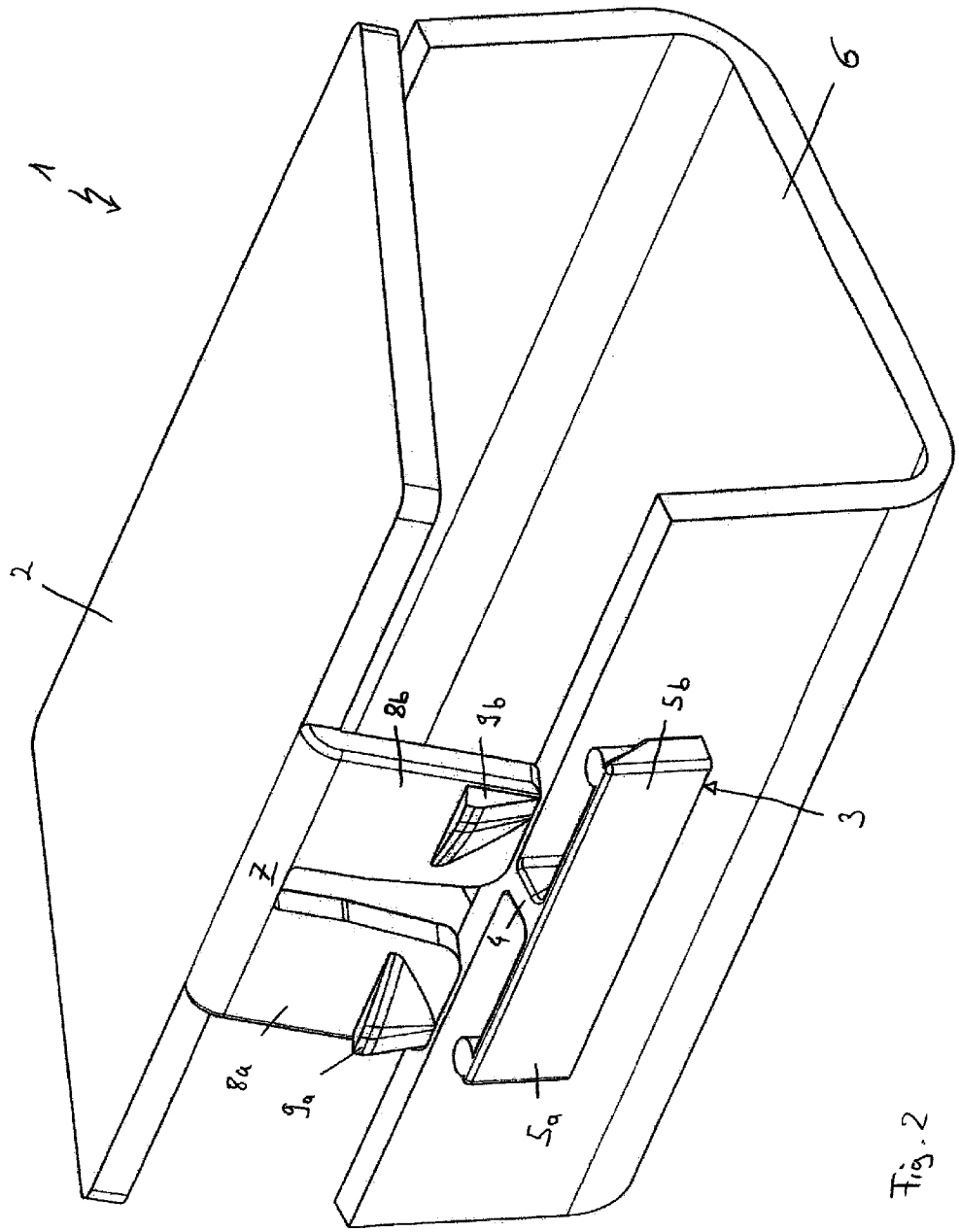
FIG. 2 shows a perspective view of the device according to one embodiment of the invention in the open state.

FIG. 2 shows the device according to the invention from FIG. 1, the only difference being that the device is in an open state.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A device for accommodating an element, comprising:
a casing having a receiving portion with a connecting piece which is connected to a housing at a first end and extends toward a second end away from the housing;
two side sections each connected to the connecting piece at one end, extending toward the other end away from the connecting piece, and extending from the connecting piece in different directions; and a cover having an insertion part for insertion into the receiving portion, wherein the insertion part has two sub-sections and each sub-section has an engaging element;

wherein the device is designed such that the insertion part can be inserted into the receiving portion, the connecting piece then being located between the sub-sections, wherein when the insertion part is inserted until each engaging element has passed the two side sections, the engaging elements prevent the insertion part from sliding out;

wherein the two side sections are connected only to the connecting piece, which is connected at its first end to the casing and extends away from the casing toward the second end, and no other element is provided that connects the side sections to the casing.

2. The device according to claim 1, wherein the casing is a housing or a container.

3. The device according to claim 1, wherein the side sections are connected to the second end of the connecting piece.

4. The device according to claim 1, wherein the side sections extend in diametrically different directions.

5. The device according to claim 1, wherein the engaging elements are tapered in such a way that their width decreases in the insertion direction.

6. The device according to claim 1, wherein the receiving portion is formed integrally with the casing.

7. The device according to claim 1, wherein the receiving portion and the casing are produced by casting.

8. The device according to claim 1, wherein the receiving portion and the casing are produced by bending and punching.

9. The device according to claim 1, wherein the receiving portion and the casing comprise plastic.

10. The device according to claim 1, wherein the receiving portion and the casing comprise metal.

11. A system comprising the device according to claim 1 and an elongate element or a grouping of elongate elements or a section of an elongate element or a grouping of elongate elements arranged in the casing.

* * * * *